June 16, 1953  F. J. FONTEIN  2,642,185
PROCESS FOR THE REFINING OF STARCH
Filed Jan. 11, 1951  3 Sheets-Sheet 1

FIG. I.

INVENTOR:
FREERK J. FONTEIN,
BY
Arthur Middleton
ATTORNEY

June 16, 1953 F. J. FONTEIN 2,642,185
PROCESS FOR THE REFINING OF STARCH
Filed Jan. 11, 1951 3 Sheets-Sheet 2

INVENTOR:
FREERK J. FONTEIN,
BY
ATTORNEY

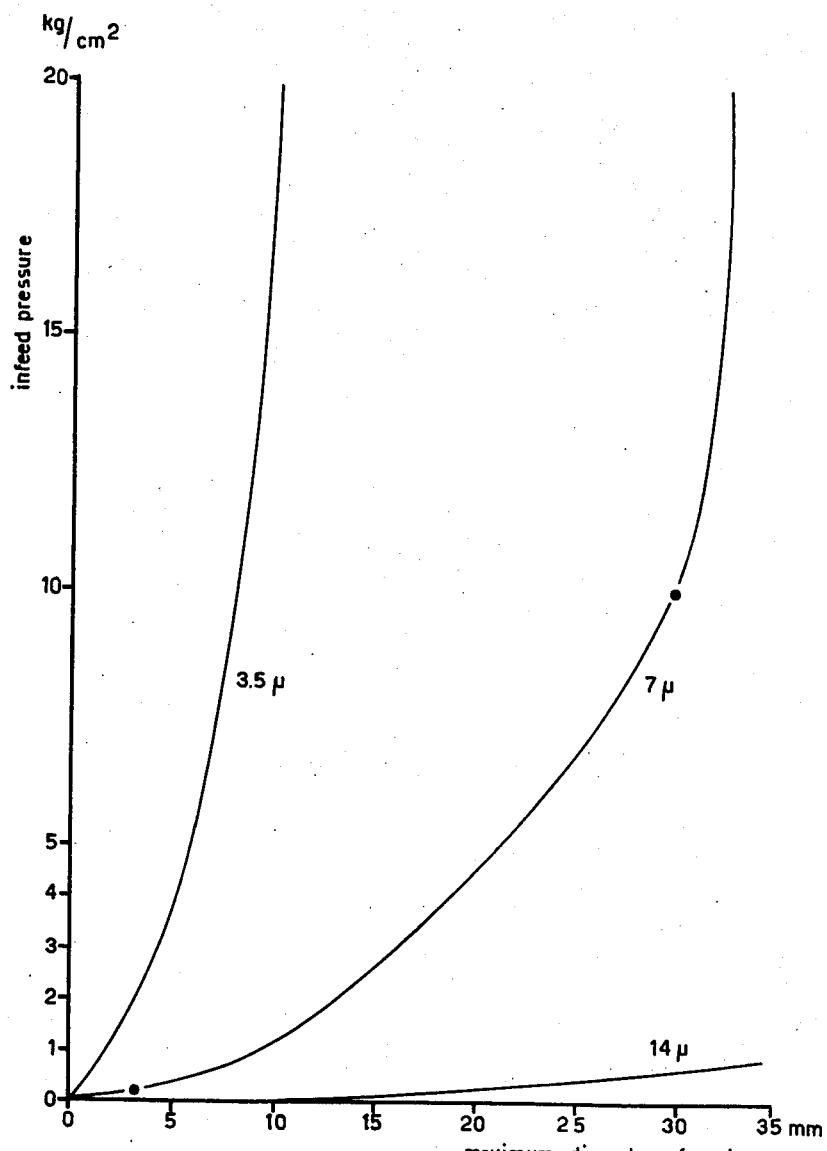

UNITED STATES PATENT OFFICE 2,642,185

PROCESS FOR THE REFINING OF STARCH

Freerk J. Fontein, Heerlen, Netherlands, assignor to Stamicarbon N. V., Heerlen, Netherlands Application January 11, 1951, Serial No. 205,598
In the Netherlands January 15, 1949

13 Claims. (Cl. 209—211)

The present invention relates to a process for the refining of starch.

There are many different kinds of starch which exhibit different properties according to the source of the raw material employed. One important property is the grain size; rice starch, for example, containing only very fine particles, ranging from zero up to a few microns and no particles larger than 7 microns. The average grain size of corn starch, on the other hand, varies between 15 and 20 microns, and wheat starch consists of particles which vary between a lower size of a few microns to a maximum size of about 30 microns.

The usefulness of starch is largely dependent upon particle size, the fine kinds having a higher commercial value than the coarse. Rice starch is very valuable and is preferred for specific purposes, namely for the preparation of so-called "high grade starch," by which it is to be understood starch consisting of particles having a diameter not greater than a maximum of 7 microns. The preparation of high grade starch from other kinds of starch, such as corn or wheat starch, has often been attempted but hitherto without success as no process could be found for separating the valuable finest particles, for instance those under 7 microns, from a suspension of particles of mixed sizes. The difficulty of effecting such separation by settling will be apparent from the fact that the settling rate in water of a starch particle with a diameter of 10 microns is only about 0.2 cm. per minute and the problem is of an entirely different order from that encountered in the purification, for example, of paper pulp where the lowest settling rate may be of the order of 3 cm. per minute mentioned in United States Patent No. 2,377,524, issued June 5, 1945, of Edward W. Samson and Alfred H. Croup.

The unsuccessful outcome of prior attempts to define starches containing particles of sizes covering a large range is, therefore, not surprising, bearing particularly in mind that a very sharp separation is required, which means that the resultant fine particle fraction has to be very pure and uncontaminated by coarse particles. At the same time the quantity of fines which occur in the separated coarse fraction has also to be kept as low as possible as representing a direct loss of valuable material.

The object of the present invention is to provide a simple solution to the hitherto unsolved problem of refining starch and, in particular to provide a method requiring a minimum of control and space which may be operated in a continuous manner to prepare high grade starch from wheat starch. A specific object of the invention is to provide a method to separate particles of a grain size over 7 microns from suspensions containing particles of a grain size above and below that size.

The present invention is based upon the discovery that upon subjecting a suspension of starch to vortical action by feeding the suspension at a selected pressure into a confined circular space (hereinafter referred to as a "cyclone") of a selected very small diameter, it is possible to obtain a very accurate separation according to a predetermined grain size of the order of magnitude between a few microns and 10 microns.

To effect such a separation it has been determined that the cyclone should have a diameter not exceeding 30 mm., this diameter is a practical maximum, because it has proved impossible to separate particles of the order of magnitude of 7 microns by vortical action in a cyclone of larger diameter.

It has further been determined that separation at a specific particle size can be effected by suitable choosing the infeed pressure over the range of from 0.2 to 20 kilograms per cm.$^2$ and the maximum diameter of the cyclone over the range of from 3 mm. to 30 mm. By suitable choosing the diameter of the infeed opening and the openings through which the separated fractions leave the cyclone, the resultant separation can be made very sharp as appears from the fact that the fraction containing the fine particles is substantially free from particles of a size over the specific size and the other coarse fraction contains no appreciable amounts of particles under the specific size. The invention accordingly renders it possible to manufacture high grade starch from wheat starch.

The method of refining a starch suspension containing starch particles of different sizes accordingly comprises, continuously feeding said suspension under pressure tangentially into and adjacent to an infeed end of a confined circular space having a maximum diameter at said infeed end and decreasing in diameter towards its opposite end, said suspension thereby being subjected to vortical action within said space by rotating therewithin at a high velocity increasing from the periphery to the centre of the space, employing an infeed pressure selected over the range of 0.2 to about 20 kilograms per cm.$^2$, employing a circular space having a maximum diameter selected over the range of 3 mm. to about 30 mm., continuously withdrawing through a central opening at said infeed end a dilute fraction containing substantially only starch particles below a specific size, continuously withdrawing through an aperture at said opposite end axially aligned with said central opening a concentrated fraction containing substantially only particles of and above said specific size, and predetermining said specific size at not substantially greater than 10 microns by selecting said infeed pressure appropriately to said maximum diameter employed.

In the following description, the central opening at the infeed end of the confined circular space or cyclone is called "base-aperture," whereas the other opening at the other end of the space, is called the "apex aperture" or "top aperture." The pressure under which the suspension is fed into the cyclone is the gauge pressure of the suspension at the point of infeed, and the "top angle" or "apex angle" is the angle included between the lines bounding a longitudinal diametral section through the cyclone.

A specific operational procedure in accordance with the invention and specific apparatus for carrying the invention into effect will now be described, by way of example only, with reference to the accompanying drawings in which:

Figure 3 is a theoretical graph showing the size of separation of starch in relation to the infeed pressure and cyclone diameter employed.

Figure 1:
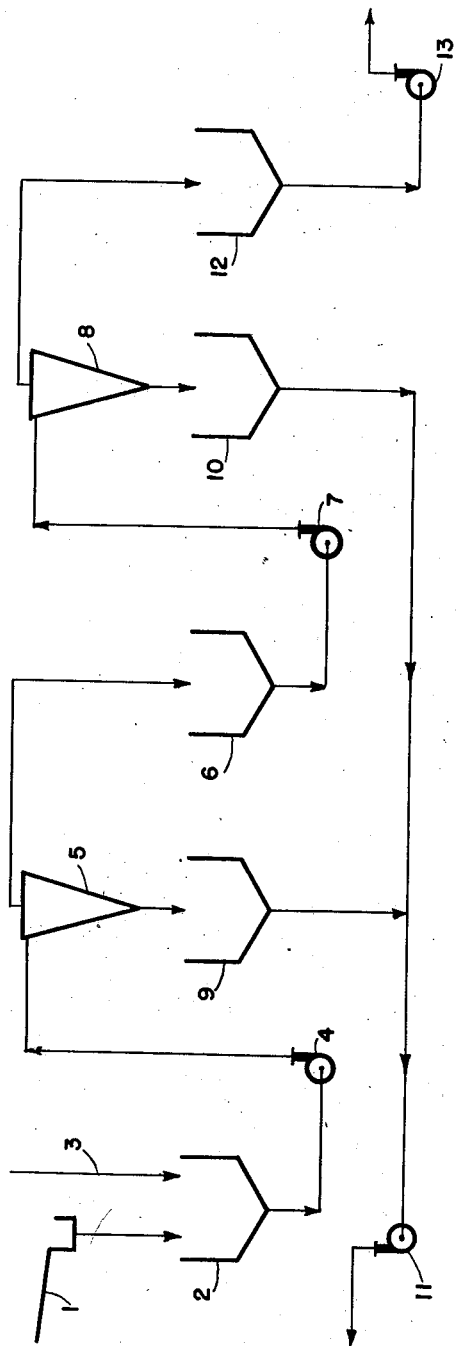
Figure 1 is a diagrammatic representation of a multistage plant for refining starch.
Figure 2:
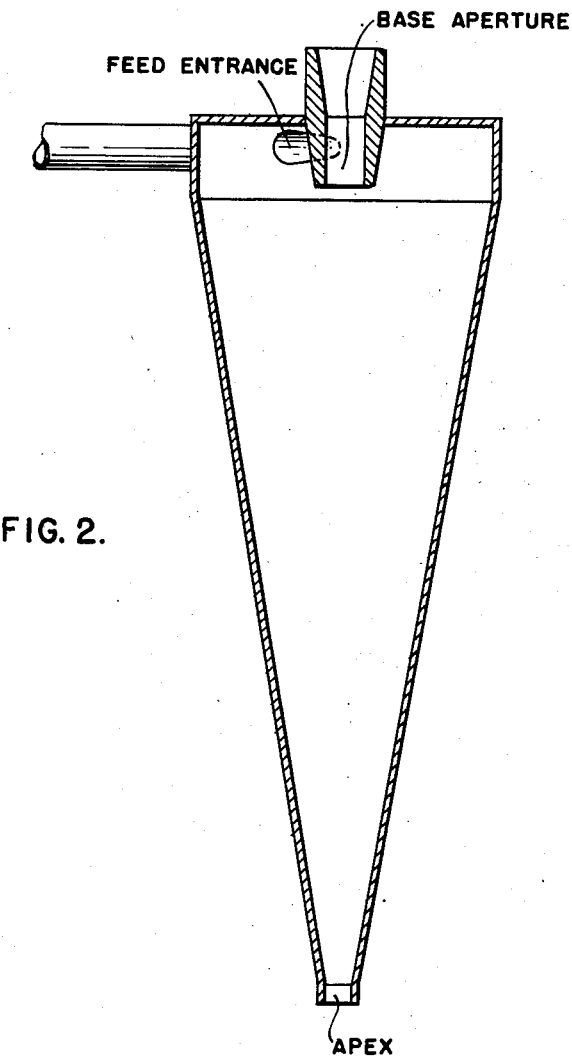
Figure 2 is a cross section of a cyclone.

Referring to Figure 1, a suspension of wheat starch is prepared in known manner, for example, with the aid of a decanting table 1. From the table 1, the suspension flows to a storage vessel 2 where its concentration may be adjusted by adding water from a supply 3 to bring it to 4° Baumé. The suspension is pumped from the storage vessel 2 by a pump 4 into a battery of cyclones 5 which are connected in parallel, one cyclone only of the battery being shown in the drawing. The infeed gauge pressure of the cyclones is assumed to be 10 kilograms per cm.$^2$. The cyclones 5 each consist of an upper cylindrical part, having a diameter of 30 mm. and a height of 8 mm., and a lower conical part, having an apex angle of 20°. The upper end of the cylindrical part of each cyclone constitutes its base and is closed by a transverse cover plate having a central opening therein, which constitutes the "base aperture" aforesaid. An infeed tube opens tangentially into the cylindrical part of each cyclone immediately adjacent to the cover plate, the diameter of the infeed opening being 4 mm. The central base aperture, which has the same diameter, is formed by a tube which protrudes axially into the inner part of the cyclone. The part of this tube, called a vortex finder, which is located within the cyclone, is 7 mm. long. The small end of the conical part of each cyclone is formed with an opening, which constitutes the "apex opening," having a diameter of 2 mm.

With the above arrangement and operating conditions, the total throughput per cyclone amounts to 800 liters per hour made up of a concentrated first fraction of 70 liters per hour of concentrated suspension leaving, through the apex opening at a concentration of 22.8° Baumé, and of a diluted second fraction of 730 liters per hour leaving the cyclone through the base aperture at a concentration of 2.07° Baumé.

The concentrated fraction contains the coarse particles and a small percentage of the fine particles, while the dilute fraction contains the majority of the fine particles with some coarse particles.

The dilute fraction leaving the cyclones through the base apertures then goes to a second storage vessel 6, from which it is pumped by a pump 7 to a second battery of cyclones 8 also disposed in parallel. Cyclones 8 have the same dimensions as the cyclones 5 and the same infeed pressure of 10 kilograms per cm.$^2$ is employed. The quantity of suspension which is treated per unit time in the second battery of cyclones is smaller than that treated in the battery of cyclones 5 and the number of cyclones in the second battery is accordingly made less than that of the first battery so that the same amounts of suspension will leave the cyclones 8 through the corresponding apertures. The fraction leaving a cyclone 8 of the second battery through the apex opening has a concentration of 20.3° Baumé, whereas the fraction leaving through the base apertures is very dilute, contains only 0.57% of dry matter and consists practically entirely of starch particles smaller than 7 microns amounting to 6% of the dry substance contained in the original infeed to the first battery of cyclones 5.

The coarse suspension leaving the cyclones of the first and second batteries through the apex openings pass into vessels 9 and 10 respectively from which it is pumped by a pump 11 to a place where it can be subjected to further treatment. The fine fraction leaving the cyclones of the second battery through the base apertures is received by a starch vessel 12 from which it can be pumped by a pump 13 to an apparatus to be thickened to a suitable concentration for instance, by filters, Dorr thickeners, cyclone thickeners or the like.

The same result was obtained with an infeed pressure to first and second cyclone batteries of only 1.0 kilogram per cm.$^2$ gauge pressure, employing cyclones of the following dimensions:

Largest diameter—7½ mm.,
Height of the cylindrical part of the cyclone—2 mm.,
Diameter of the infeed opening—1 mm.,
Diameter of the central base aperture—1 mm.,
Length of the vortex finder within the cyclone—2 mm.,
Diameter of the apex opening—0.5 mm., and
Apex angle—20°.

The throughput capacity of these smaller cyclones under the infeed conditions stated was 16 liters per hour per cyclone but the ratio of the quantities leaving the smaller cyclones through the apex openings and base apertures was the same as for the cyclones having a diameter of 30 mm. Even smaller cyclones may be used in which case the infeed pressure should be reduced proportionately to the area of the largest part of the cylindrical cross section, in order to obtain a separation at the same particle size.

It should be noted, however, that the smoothness of the inner surface of the cyclone is of paramount importance when very small cyclones are used and that there is an increasing tendency with decreasing size for the openings of the cyclone to clog; as a practical matter, it has been found that 3 mm. is an absolute minimum for the diameter of the cylindrical part of the cyclone.

It has also been ascertained that a smaller size of separation can be achieved in a cyclone having a largest diameter of 3 mm. than with a cyclone having a largest diameter of 30 mm. Likewise, other factors remaining constant, an infeed pressure of 20 kilograms per cm.$^2$ is found to result in a smaller size of separation than an infeed pressure of 0.2 kilogram per cm.$^2$. The diameter of the cyclone and the infeed pressure thus both control the size at which separation can be effected as appears more clearly from the accompanying graph of Figure 3, from which it may be seen, for example, that cyclones having a maximum diameter ranging from 3 to 30 mm. will be effective to separate starch particles at a size of 7 microns at various infeed pressures ranging from 0.2 to 20 kilograms per cm.$^2$. Figure 3 also shows that in separating a starch suspension at a particle size of say 3.5 microns the practical limit to the maximum diameter of cyclone is approximately 10 mm. whatever the pressure, or stated otherwise that it is not possible to effect separation at 3.5 microns in, say, a 20 mm. diameter cyclone.

The diameters of the feed and discharge apertures, the cone angle and the length of the vortex finder are also found to influence the particle size at which separation takes place, and these parameters may be varied within a wide range, especially when two or more are changed simultaneously. It should be understood therefore that the invention is not confined to one special shape of the cyclone but includes the use of cyclones which are not of a conical shape, as described, for example, in my copending patent applications Serial No. 715,029, filed December 9, 1946, and Serial No. 81,076, filed March 12, 1949. For all such cyclones, however, the largest diameter should be from 30 to 3 mm. and the infeed pressure should be from 20 to 0.2 kilogram per cm.$^2$ according to the largest diameter of the cyclone employed. Infeed pressures higher than 20 kilograms per cm.$^2$ can be used but do not result in a better separation and, therefore, only increase the cost of the process to no advantage.

This is a continuation in part of my application Serial No. 138,563.

I claim:

1. The method of refining a starch suspension containing starch particles of different sizes which comprises, continuously feeding said suspension under pressure tangentially into and adjacent to an infeed end of a confined circular space having a maximum diameter at said infeed end and decreasing in diameter towards its opposite end, said suspension thereby being subjected to vortical action within said space by rotating therewithin at a high velocity increasing from the periphery to the centre of the space, employing an infeed pressure selected over the range of 0.2 to about 20 kilograms per cm.$^2$, employing a circular space having a maximum diameter selected over the range of 3 mm. to about 30 mm., continuously withdrawing through a central opening at said infeed end a dilute fraction containing substantially only starch particles below a specific size, continuously withdrawing through an aperture at said opposite end axially aligned with said central opening a concentrated fraction containing substantially only particles of and above said specific size, and predetermining said specific size at not substantially greater than 10 microns by selecting said infeed pressure appropriately to said maximum diameter employed.

2. The method of refining a starch suspension containing starch particles of different sizes which comprises, effecting a first fractionation of said suspension by the steps of continuously feeding said suspension under pressure tangentially into and adjacent to an infeed end of a confined circular space having a maximum diameter at said infeed end and decreasing in diameter towards its opposite end, said suspension thereby being subjected to vortical action within said space by rotating therewithin at a high velocity increasing from the periphery to the centre of the space, employing an infeed pressure selected over the range of 0.2 to about 20 kilograms per cm.$^2$, employing a circular space having a maximum diameter selected over the range of 3 mm. to about 30 mm., continuously withdrawing through a central opening at said infeed end a dilute fraction containing a majority of fine starch particles below a predetermined specific size continuously withdrawing through an opening at said opposite end axially aligned with said central opening a concentrated fraction containing a majority of starch particles of and above said specific size; further fractionating said dilute fraction at the said specific particle size in a further confined circular space by the steps of feeding said dilute fraction into a further confined circular space under conditions of infeed pressure and space diameter within the limits specified for said first fractionation, by continuously withdrawing through a central opening at the infeed end of said further space a further diluted fraction containing substantially only starch particles of and below said specific size and by continuously withdrawing through an axially aligned opening at the opposite end of said further space a concentrated fraction containing substantially only particles above said specific size; and predetermining said specific size at not substantially greater than 10 microns by selecting said infeed pressures appropriately to the maximum diameter of said confined spaces employed.

3. A method according to claim 1, including the step of subjecting said dilute fraction to a thickening treatment to recover the solid material contained therein.

4. A method according to claim 2, including the step of subjecting said further diluted fraction to a thickening treatment to recover the solid material contained therein.

5. A method according to claim 1, directed to the preparation of a high grade wheat starch by the employment of a suspension containing wheat starch particles.

6. A method according to claim 1, which consists in so selecting the maximum diameter of and the infeed pressure to said confined space that said dilute fraction contains substantially only starch particles having a diameter, approximately, of not more than 7 microns.

7. A method according to claim 1, which consists in so selecting the maximum diameter of and the infeed pressure to said confined space that said dilute fraction contains substantially only starch particles having a diameter, approximately, of not more than 7 microns, and subjecting said dilute fraction to a thickening treatment to recover the solid material contained therein.

8. A method according to claim 1 directed to the preparation of a high grade wheat starch by the employment of a suspension containing wheat starch particles, which consists in so selecting the maximum diameter of and the infeed pressure to said confined space that said dilute fraction contains substantially only starch particles having a diameter, approximately, of not more than 7 microns, and subjecting said dilute fraction to a thickening treatment to recover a high grade wheat starch therefrom.

9. A method according to claim 2 directed to the preparation of a high grade wheat starch by the employment of a suspension containing wheat starch particles, which consists in so selecting the maximum diameter of and the infeed pressure to said further confined space that said further diluted fraction contains substantially only starch particles having a diameter, approximately, of not more than 7 microns, and subjecting said further diluted fraction to a thickening treatment to recover a high grade wheat starch therefrom.

10. The method of separating particles of a grain size below $x$ microns, where $x$ has a value from 3.5 to 10, from a suspension containing particles of a size above and below said grain size $x$ which comprises, continuously feeding said suspension under pressure tangentially into and adjacent one end of a confined circular space having a maximum diameter at said infeed end and decreasing in diameter towards its opposite end, said suspension thereby being subjected to vortical action within said space by rotating therewithin at a high velocity increasing from the periphery to the centre of the space, continuously withdrawing through a central opening at said infeed end a dilute fraction containing substantially only particles below $x$ microns, continuously withdrawing through an opening at said opposite end axially aligned with said central opening, a concentrated fraction containing substantially only particles of and above $x$ microns, and predetermining said grain size $x$ by (1) the employment of a circular space having a maximum diameter selected over the range of 3 mm. to about 30 mm., (2) the employment of an infeed pressure selected over the range of 0.2 to about 20 kilograms per $cm.^2$, and (3) maintaining said infeed pressure at a value appropriate to the desired grain size $x$ having regard to the maximum diameter of the said space employed.

11. A method according to claim 2, directed to the preparation of a high grade wheat starch by the employment of a suspension containing wheat starch particles.

12. A method according to claim 2 which consists in so selecting a maximum diameter of and the infeed pressure to said confined spaces that said further diluted fraction contains substantially only starch particles having a diameter, approximately, of not more than seven microns.

13. A method according to claim 2, which consists in so selecting the maximum diameter of and the infeed pressure to said confined spaces that said further diluted fraction contains substantially only starch particles having a diameter, approximately, of not more than seven microns, and subjecting said further diluted fraction to a thickening treatment to recover the solid material contained therein.

FREERK J. FONTEIN.

References Cited in the file of this patent

UNITED STATES PATENTS

| Number | Name | Date |
|---|---|---|
| 643,323 | Duryea | Feb. 13, 1900 |
| 1,629,182 | Stull | May 17, 1927 |
| 2,377,524 | Samson et al. | June 5, 1945 |

FOREIGN PATENTS

| Number | Country | Date |
|---|---|---|
| 607,785 | Great Britain | Sept. 6, 1948 |

OTHER REFERENCES

Chemical Engineer's Handbook, by Perry, second edition, 1941, pages 1857 to 1860.

Cleaning of Coal by Heavy Liquids, by Driessen; 209–173s. (The Institute of Fuel, August 1939, p. 335.)

Chemical Engineering, June 1950, pp. 146, 209–211, "Centrifugal Classifier."

Chemical Engineer's Handbook, by Perry, 3rd ed., 1950; pages 1023–1024.

Radley: Starch and Its Derivatives, 2nd ed., N. Y., 1944, pp. 31 and 302. (Copy in Div. 43.)

Kerr: Chem. & Ind. of Starch, N. Y., 1944, pp. 6, 7 and 8. (Copy in Div. 43.)